United States Patent
Toll

(10) Patent No.: US 9,802,665 B2
(45) Date of Patent: *Oct. 31, 2017

(54) CRUISE SADDLE

(71) Applicant: Tampa Bay Recreation, LLC, Lutz, FL (US)

(72) Inventor: Steven G. Toll, Tampa, FL (US)

(73) Assignee: ISM Saddles, LLC, Lutz, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/382,373

(22) PCT Filed: Mar. 5, 2013

(86) PCT No.: PCT/US2013/029099
§ 371 (c)(1),
(2) Date: Sep. 2, 2014

(87) PCT Pub. No.: WO2013/134253
PCT Pub. Date: Sep. 12, 2013

(65) Prior Publication Data
US 2015/0097401 A1     Apr. 9, 2015

Related U.S. Application Data

(60) Provisional application No. 61/607,110, filed on Mar. 6, 2012.

(51) Int. Cl.
*B62J 1/00* (2006.01)
*B62J 1/08* (2006.01)
*B62J 1/18* (2006.01)

(52) U.S. Cl.
CPC ............... *B62J 1/007* (2013.01); *B62J 1/08* (2013.01); *B62J 1/18* (2013.01)

(58) Field of Classification Search
CPC ............... B62J 1/00; B62J 1/002; B62J 1/007
See application file for complete search history.

(56) References Cited

U.S. PATENT DOCUMENTS

| | | | | |
|---|---|---|---|---|
| 532,444 | A * | 1/1895 | Christy | B62J 1/002 297/202 |
| 537,375 | A * | 4/1895 | Wright et al. | B62J 1/005 297/201 |

(Continued)

FOREIGN PATENT DOCUMENTS

WO    WO 2011/019650    2/2011

OTHER PUBLICATIONS

International Search Report for PCT/US2013/029099.

(Continued)

*Primary Examiner* — Philip Gabler
(74) *Attorney, Agent, or Firm* — Neifeld IP Law, PC

(57) ABSTRACT

A split-nose touring bicycle seat for touring, comprising: a rigid plastic base provided with attachment points for mounting the seat to a bicycle frame; a total length of the seat of about 230-265 mm; a total width of about 270-310 mm; a split nose section formed by two elongated protrusions of substantially constant width extending forward from a medial section to a front surface; said elongated protrusions angle inwardly, a cushioned pubis bone support surface with a substantially flat side profile, and a drooped nose section forward thereof and substantially vertical outer sides.

3 Claims, 6 Drawing Sheets

(56) References Cited

U.S. PATENT DOCUMENTS

| | | | | |
|---|---|---|---|---|
| 612,972 | A * | 10/1898 | Leech | B62J 1/002 |
| | | | | 297/201 |
| 1,858,477 | A * | 5/1932 | Blake | B62J 1/02 |
| | | | | 297/202 |
| 4,773,705 | A | 9/1988 | Terranova | |
| 6,113,184 | A * | 9/2000 | Barnes | B62J 1/007 |
| | | | | 297/197 |
| 6,193,309 | B1 * | 2/2001 | Gootter | B62J 1/002 |
| | | | | 297/202 |
| 7,934,770 | B2 * | 5/2011 | Toll | B62J 1/007 |
| | | | | 297/202 |
| 8,845,018 | B2 * | 9/2014 | Toll | B62J 1/007 |
| | | | | 297/195.1 |
| 2002/0117880 | A1 * | 8/2002 | Ladson, III | B62J 1/007 |
| | | | | 297/201 |
| 2005/0046245 | A1 | 3/2005 | Yu | |
| 2007/0069557 | A1 | 3/2007 | Toll | |
| 2010/0109392 | A1 | 5/2010 | Toll | |
| 2015/0239515 | A1 * | 8/2015 | Toll | B62J 1/007 |
| | | | | 297/214 |

OTHER PUBLICATIONS

Written Opinion for PCT/US2013/029099.
Feb. 8, 2012, Google English translation for CN 202138446.
English translation of Search Report of Patent Application No. 102107588, an application related to the subject US application.
Supplementary European Search Report for EP 13757235, an application related to the subject US application.

* cited by examiner

CRUISE SADDLE

CROSS REFERENCE TO RELATED APPLICATIONS

This application is a national stage entry of PCT/US13/29099, filed Mar. 5, 2013, which published as WO 2013/134253 on Sep. 12, 2013, and claims priority to provisional Application No. 61/607,110, filed Mar. 6, 2012, entitled "Cruise Saddle", which is hereby incorporated by reference.

BACKGROUND

1. Technical Field

A bicycle seat that comfortably supports a bicycle rider.

2. Description of the Related Art

Bicycle seats have a generally horizontal profile with a narrow front-end section, the nose or horn, and a wider, flared tail section with a concave intermediate section for thigh clearance. They include a pliable, semi-rigid molded plastic, or nylon shell, over which conforming padding material is placed, and finally a leather, plastic, or vinyl cover is fitted.

A bicycle seat for the casual rider should support er comfortably for rides of long duration and aid the rider in controlling and stabilizing the bicycle. It is well known to bicycle riders that the conventional saddle can cause chafing, blistering, bruising, and possibly injury. A primary cause of discomfort is the pressure exerted on sensitive areas of the body (i.e. the sacral, coccal, ischial, and perineal/genital regions) when the weight of the rider rests on a traditional bicycle seat.

There have been various attempts in the prior art to design bicycle seats that provide greater comfort and hygienic safety.

In order to provide greater comfort to the rider, the prior art teaches pre-forming concave regions into the horizontal seat surface corresponding to the pelvic bone and perineum regions of the rider. The purpose is to reduce compression on the pudendal arteries and nerves while not interfering with movement of the rider's legs in the pedaling motion.

Another way to add comfort to a bicycle seat is by adding a cushioning material to the seat surface. A cloth cover or like material is selectively stuffed with a flexible and resisting material to form soft cushion lobes in strategically placed ridges to support the pelvic bones of the rider. However, excessive movement or grinding of the pelvic areas can cause bruising, groin pain, numbness, urethritis, neuritis, seat sores, and chafing.

These problems can be aggravated by friction and pressure t exerted on the blood vessels and nerves along the inner and underside of the rider's pelvic region. The front-end section (nose) of a traditional seat fits directly against the pelvic structures. This results in occlusion of arteries and veins supplying blood flow to the penis and clitoris, as well as, compression of local nerves as they are sandwiched between the nose of the bicycle seat and the bony structures of the anterior pelvis. The resultant outcome is a numbing effect or paresthesia, as reported by many cyclists that can result in sustained paresthesia of the groin and penis, delayed or immediate impotence, and perhaps even an elevated prostate specific antigen.

Recent studies have linked perineal pressure caused by traditional bicycle seats to urinary tract and yeast infections. Sifting on traditional bicycle seats can compress tender genital tissues against the seat causing irritation to the genitals.

In both male and female riders the crotch area contains nerves and pudendal arteries leading to the genetals. In the male, the pudendal artery carries blood flow that enables erection. Sifting on a traditional bicycle seat can increase the pressure in the pudendal arteries causing a decrease in blood flow for both men and women. This decrease in blood flow may cause numbness potentially leading to impotency in certain male bicycle riders. (Numbness is caused by compression of the pudendal nerve. However, compression of the artery is not something a rider feels.

In order to overcome these problems, the prior art provides seats with a groove at the nose portion of the bicycle seat, which results in a right side nose portion separated by a gap from the left side nose portion (split nose). The opening is intended to reduce the pressure but does not always work, and sometimes creates even more pressure exerted on the genital area by the rider's weight on the seat.

U.S. Pat. No. 6,193,309, to Gootter, et al., discloses a split nose seat design.

U.S. Design Patent 417,560, to Tollefson et al., teaches a split nose design that is essentially a traditional bicycle seat with a split nose; consequently the width of the nose section is relatively narrow, about 40 mm or less. Merely adding a gap to the narrow nose structure of a traditional saddle does not appear to provide much, if any, benefits.

Improved split-nose bicycle seats contoured to fully support the coccyx, sacrum, and ischium bones, while providing a relieved area for the perineum/genital regions, have been disclosed by the present inventor in U.S. patent application Ser. No. 12/685,311, filed Jan. 11, 2010, and PCT/US2010/044868, filed 9 Aug. 2010, which are both incorporated herein by reference. These prior designs provide support for the tissues and musculature surrounding the aforementioned pelvic areas.

However, there is still need for a seat which helps the casual rider who is looking for a more comfortable riding experience. The ISM Cruise® borrows from the proven medically superior technology used in the ISM line of saddles but with changes for a different type of rider, i.e., for non-competitive situations.

The ISM Cruise saddle has two front arms which are shorter than the front arms of previous ISM saddles and the mid and the rear sections of the saddle are substantially wider.

I have found that the shorter front arms provide support to the sit bones and the pubic rami of the pelvis keeping the pudendal nerve and artery free of compression, while dramatically increasing the width of the seat near the midsection, the rider is able to stay in an upright or semi upright position without rotation of the hips and a need for the longer front arms. The saddle width completely supports the gluteus muscles eliminating gravitational pull on those muscles resulting in a comfortable and safe ride.

SUMMARY

An object of the present invention is to provide A split-nose touring bicycle seat for touring, comprising: a rigid plastic base provided with attachment points for mounting the seat to a bicycle frame; a total length of the seat of about 230-265 mm; a total width of about 270-310 mm; a split nose section formed by two elongated protrusions of substantially constant width extending forward from a medial section to a front surface; said elongated protrusions angle inwardly, a cushioned pubis bone support surface with a substantially flat side profile, and a drooped nose section forward thereof and substantially vertical outer sides.

DETAILED DESCRIPTION OF THE INVENTION

Figure 1:
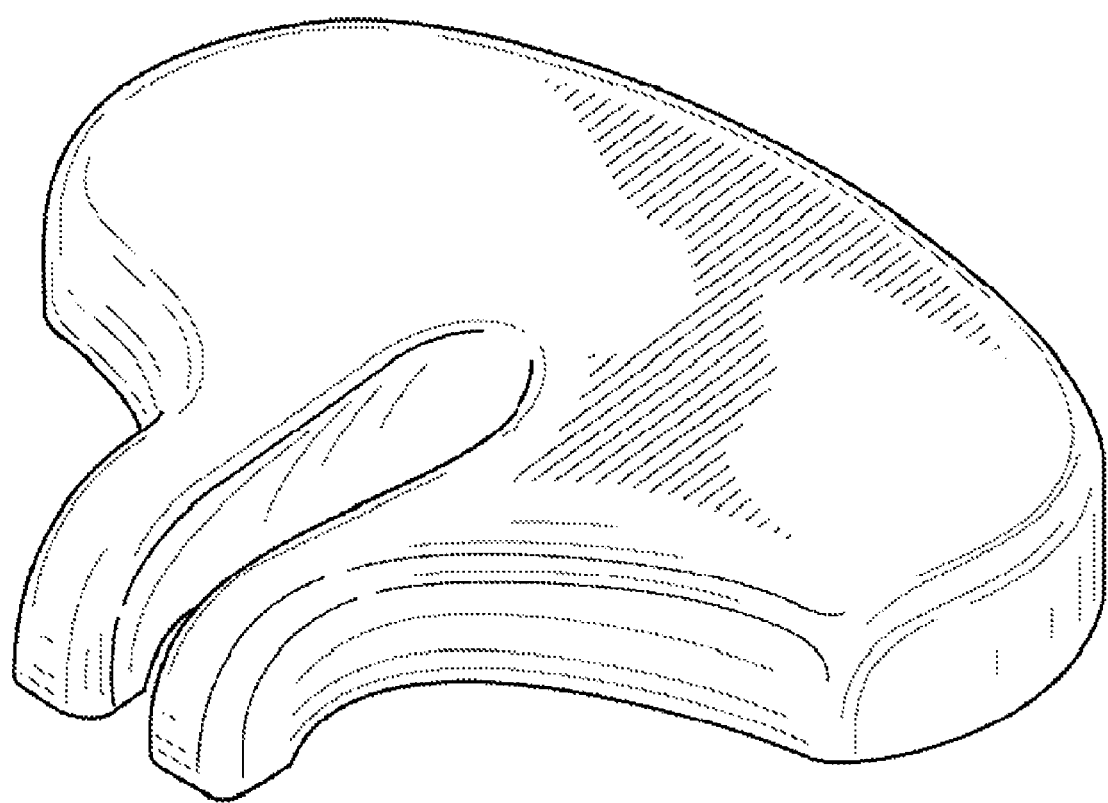
FIG. 1 is a perspective view of the saddle of the present invention.
Figure 2:
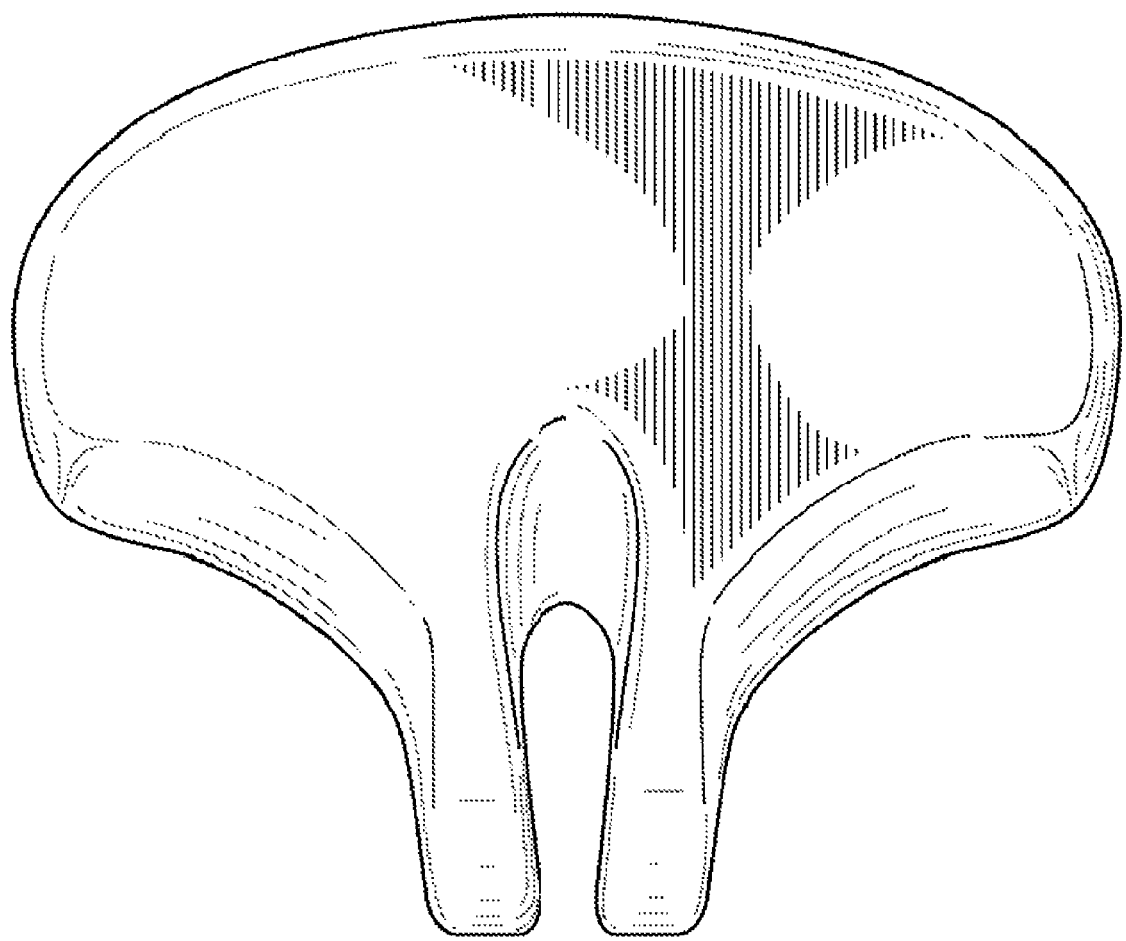
FIG. 2 is a top plan view of the saddle of FIG. 1.
Figure 3:
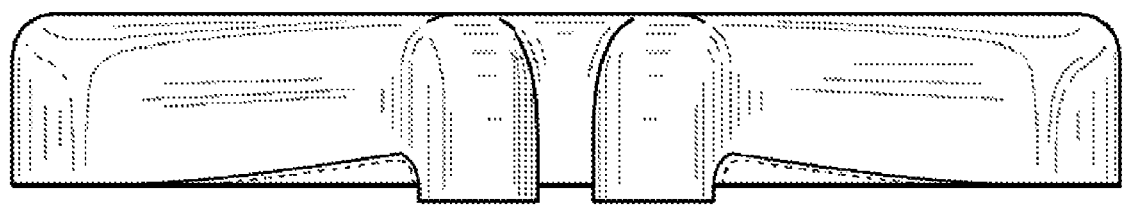
FIG. 3 is a front view of the saddle of FIG. 1.
Figure 4:
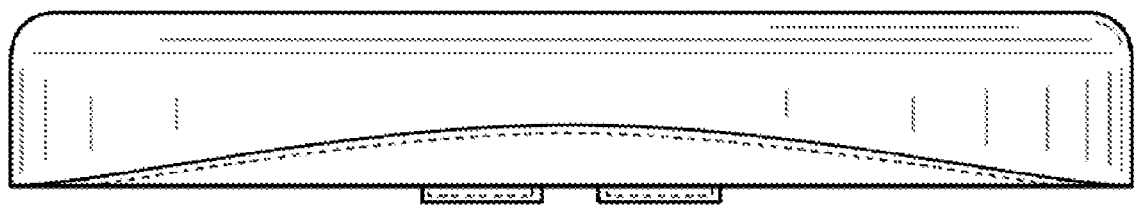
FIG. 4 is a rear view of the saddle of FIG. 1.
Figure 5:
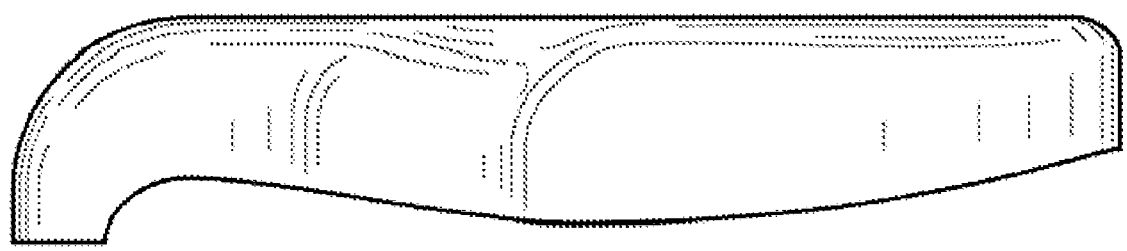
FIG. 5 is a left side elevation view of the saddle of FIG. 1.
Figure 6:
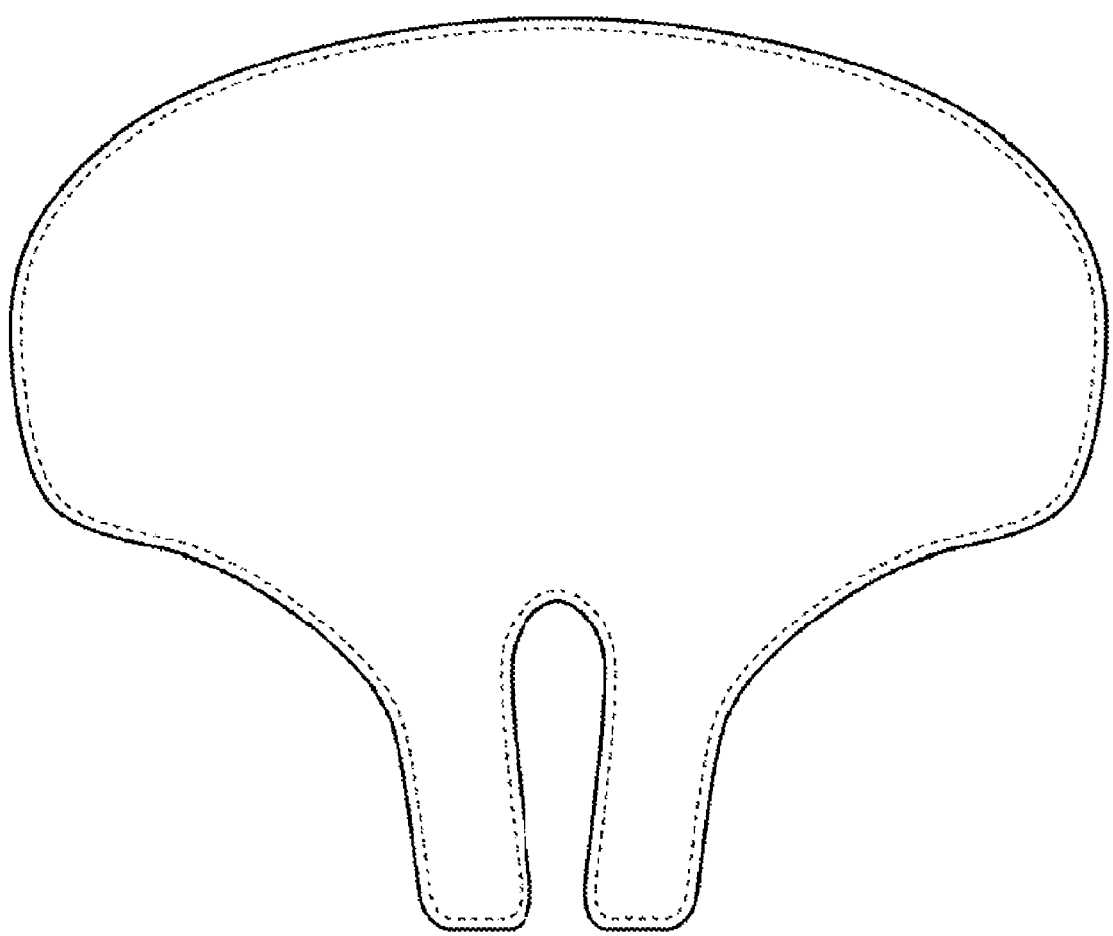
FIG. 6 is a bottom plan view of the saddle of FIG. 1.

The bicycle saddle of the present invention provides anatomic features which support the sit bones and the pubic rami of the pelvis, keeping the pudendal nerve and artery free of compression. The present saddle is wider than it is long so the rider is able to stay in an upright or semi upright position without rotation of the hips. The saddle width completely supports the gluteus muscles eliminating gravitational pull on those muscles resulting in a comfortable and safe ride.

The frame is a one-piece plastic frame preferably made of an injection molded polypropylene, polyurethane, polymer, ABS copolymer, nylon or other like material. The shell/frame includes an attachment device for mounting the seat to the bicycle's frame. The attachment device and the outerwear surface are conventional and well-known to those skilled in the art and will not be discussed in detail.

The seat includes a small bifurcated front-end section (split nose), a medial section, and a rear-end section (tail). The seat widens from the nose to the back of the medial section and narrows thereafter to rear end, defining an overall length L and a width W.

The total length of the seat is 230-265 mm, preferably about 245 mm. The total width is about 270-310 mm, preferably about 295 mm.

Front-End Section (Split Nose)

The front end of the seat according to the present invention is a split nose formed by two elongated protrusions of substantially constant width extending forward from a medial section to the front surface.

The nose includes a longitudinally extending gap between these elongated protrusions. The longitudinal gap is sized and contoured to provide pressure relief due to reduced contact of the private parts (perineum and/or genitalia, depending on forward or rearward riding position, respectively) of both male and female riders.

The depth of the longitudinal gap is about 90-100 mm but the exact dimensions corresponding to the depth, width, and height of the longitudinal gap may vary depending on the performance and comfort requirements of different riders and bicycles. These dimensions can be varied to accommodate different sized pelvic structures and intended uses.

The split nose section is relatively short and drops away or droops quickly. Having a drooped nose reduces or eliminates pressure on the superficial perineum area which may be produced by other bicycles seats.

Each half of the split nose is strategically positioned and padded to provide a cushioned pubis bone support surface having a substantially flat side profile. The split nose also provides support for the upper back portion of the rider's thighs, thereby reducing the weight to be supported by the buttocks in forward riding positions.

A cutout separates the right side nose from the left side nose at the front-end section of the seat. The longitudinally extending gap between said elongated protrusions is about 10 mm near the front and widens aft to about 30 mm, preferably 25 mm.

The present invention contemplates having the central groove in the form of a different shape such as a rectangle, ellipse, pear, or hyperbola.

The central gap and the cutout cooperate with each other to define an open space for relieving pressure on the pudendal arteries and nerves of a seat occupant when in a forward riding postion, while providing increased comfort during extended periods of use in a relaxed cruise position.

Medial Section

The medial section includes an area that supports a rider's buttocks and tailbone, extending from about 40 mm fore and aft of the widest point. The sides of the medial section curve gently toward the area where the front arms begin to form.

Rear End Section (Tail)

The top surface of the rear end section is substantially flat. The tail is well-padded and relatively wide compared to traditional seats.

The present invention may include cushioning gel layer against any appreciable lateral movement relative to the shell, and be of a thickness and in a location which permits only limited up and down deflection. A thin gel layer may be located below the rider's ischial pelvic or sitting bones and genital areas.

However, if the gel layer extends downwardly onto the sloping side portions of the seat, it may cause excessive movement for the rider along with rubbing and chafing of the skin. The gel layer should have sufficient thickness to provide adequate deformation to relieve excessive pressure on the pelvic bones so as to provide a comfortable ride.

A layer of relatively firm plastic foam is advantageously and preferably provided between the seat lower shell and the flexible cover to provide additional resilient support for the rider and for constraining the gel layer.

The seat of the present invention comprises combined features that provide full anatomical support and accommodation for areas of the pelvis including the surrounding tissues and musculature when the rider is in a forward position, but also exceptionally comfortable to use even for long periods of casual riding. It is light in weight, small, attractive in appearance, and streamlined. The seat weight is approximately 290-450 grams and its height is about 45-50 mm.

The seat of this invention includes a combination of features, including an extended drooped nose, wide medial section, cutout, and central gap, to provide greater and more even weight support to the rider. Thus, in a forward or competitive riding position, pressure upon the perineum/genital region is greatly diminished and sometimes eliminated, as the pudendal artery and the pudendal nerve remain free of compression; but the seat remains exceptionally comfortable for long periods of touring in a non-competitive situation.

The seat for a touring bicycle is designed for maximum comfort. The present invention contemplates adding a high-density foam padding to the basic design and adding a leather covering.

The chart below shows relative blood flows based on measurement of blood gasses. A goal is to reduce or eliminate compression of the pudendal nerve and artery when a rider assumes a less aggressive riding position. Blood flow averaged better than 100% during the test. The more narrow width allows for reduced saddle interference of the hamstrings. Here the rider was riding a Cannondale Quick hybrid bicycle in the 60 and 90 degree positions. The bike is an upright bicycle and the handle bars are straight. No drops. The test ride went on for just over 20 minutes. Blood flow averaged better than 100% during the test. As one can see from the results, the rider began moving on the saddle testing different positions (from 11:15-11:21). When he settled back into the proper riding position the numbers began to climb. All the results were good compared to a Serfas comfort saddle in which the average blood flow was 41.57%.

| Cruise (1 min readings) | O2 | % Blood Flow | CO2 | Power mW | |
|---|---|---|---|---|---|
| 11:04:30 | 49 | 100 | 25 | 309 | BASE LINE |
| 11:05:00 | 53 | 108.16 | 26 | 304 | |
| 11:06:00 | 59 | 120.4 | 27 | 301 | |
| 11:07:00 | 58 | 118.36 | 28 | 307 | |
| 11:08:00 | 59 | 120.4 | 30 | 307 | |
| 11:09:00 | 55 | 112.24 | 29 | 313 | |
| 11:10:00 | 58 | 118.36 | 28 | 301 | |
| 11:11:00 | 52 | 106.12 | 27 | 339 | |
| 11:12:00 | 48 | 97.95 | 28 | 353 | |
| 11:13:00 | 53 | 108.16 | 27 | 325 | |
| 11:14:00 | 50 | 102.4 | 26 | 338 | |
| 11:15:00 | 48 | 97.95 | 26 | 352 | |
| 11:16:00 | 47 | 95.91 | 26 | 365 | |
| 11:17:00 | 45 | 91.83 | 26 | 367 | |
| 11:18:00 | 43 | 87.75 | 27 | 366 | |
| 11:19:00 | 48 | 97.95 | 27 | 350 | |
| 11:20:00 | 51 | 104.08 | 26 | 354 | |
| 11:21:00 | 48 | 97.95 | 26 | 346 | |
| 11:22:00 | 52 | 103.1 | 26 | 346 | |
| 11:23:00 | 52 | 103.1 | 26 | 345 | |
| 11:24:00 | 54 | 110.2 | 27 | 349 | |
| 11:25:00 | 55 | 112.24 | 27 | 350 | |
| Average | | 105.45 | | | |

The embodiments of the invention described above are to be considered illustrative and not restrictive; the scope of the invention being indicated by the appended claims. All changes which come within the meaning and range of equivalency of the claims are intended to be embraced therein.

The invention claimed is:

1. A split-nose bicycle seat for touring, comprising:
a rigid plastic base provided with attachment points for mounting the seat to a bicycle frame, said plastic base covered by a foam cushion layer,
a total length of the seat of about 230-265 mm,
a total width of about 270-310 mm,
a split nose section formed by two elongated protrusions of substantially constant width extending forward from a medial section to a front surface, said elongated protrusions angle inwardly,
said medial section having a substantially flat top surface that extends backward to a rear-end section also having a substantially flat top surface,
said medial section providing a cushioned pubis bone support surface with a gel cushion layer above the foam cushion layer and with a substantially flat side profile, a drooped nose section forward thereof, and substantially vertical outer sides.

2. The seat of claim 1, wherein the total width is about 290-300 mm.

3. The seat of claim 1, wherein the total length is about 240-250 mm.

* * * * *